United States Patent Office 3,213,112
Patented Oct. 19, 1965

3,213,112
TETRAHYDROFURANS
Arthur H. Neeley, Short Hills, and Russell K. Frantz, Millington, N.J., assignors to Air Reduction Company Incorporated, New York, N.Y., a corporation of New York
No Drawing. Filed Feb. 17, 1956, Ser. No. 566,101
8 Claims. (Cl. 260—346.1)

This invention relates to new heterocyclic organic compositions of matter and to methods for their preparation and more particularly concerns products having a five-membered ether ring and substituted nitro groups and methods for making these products.

The present invention is based on the discovery that certain acetylenic alcohols will react with nitroform $CH(NO_2)_3$, in the presence of a catalyst to give novel nitrated reaction products which can be referred to as trinitromethyl substituted tetrahydrofurans.

In the study of compounds resulting from the reaction of nitroform with the acetylenic hydrocarbons, there were difficulties in formulating certain reaction mechanisms and it was hoped that the reaction of nitroform with acetylenic alcohols would prove informative. Quite unexpectedly the heterocyclic compounds and methods constituting the present invention resulted.

The process of this invention is generically applicable to acetylenic alcohols which have an unhindered acetylenic bond, at least four carbon atoms, and a free or terminal hydroxyl group.

By the expression "unhindered acetylenic bond" as used herein and in the appended claims is meant an acetylenic compound which does not have an acetylenic bond appreciably less reactive than butynediol due to steric effect, such as exists in tetramethylbutynediol. The term, an "acetylenic alcohol having a terminal hydroxyl group," is meant to indicate a structure in which the position of the hydroxyl group is attached to one end of the carbon chain so that a cyclic structure can be formed. Thus, though 3-butyne-2-ol has four carbon atoms and a hydroxyl group, the hydroxyl group is not positioned on a terminal carbon and a cyclic formation does not result.

A preferred embodiment of the present invention comprises reacting nitroform and butynediol-1,4 in methyl alcohol with the use of a mercuric nitrate catalyst. Recrystallization resulted in obtaining a fine white crystalline product (a solid addition product). This product was characterized by the presence of nitro groups, a free hydroxyl group, and an oxygen ether linkage in a 5-membered cyclic arrangement. Tests showed the usefulness of this reaction product as an intermediate in the preparation of amines by the reduction of the nitro groups and the preparation of bromo-compounds by the displacement of the hydroxyl group. The addition product itself is useful as a mild oxidizing agent and can be used in place of perbenzoic acid. The above preferred embodiment is described further in the following examples.

The following examples are given for illustrative purposes and are not intended to place any restrictions on the herein described invention.

*Reaction of nitroform and butynediol-1,4*

Into a three-necked flask equipped with thermometer, condenser and stirrer was placed 10.0 g. of nitroform, 8.0 g. of butynediol, 25 cc. of methyl alcohol and 10.0 drops of a mercuric nitrate catalyst. The solution was stirred and heat was applied to maintain it at the reflux temperature of the alcohol. The solution turned from dark grey to green and then red. After two and one-half hours the solution was cooled below 50° and approximately half of the solvent was removed by a nitrogen stream or by vacuum suction. The solution was cooled to 0° and water was added with vigorous stirring until cloudiness appeared. It was then placed in the cooler at —10°. In a half hour, crystals started to form on the bottom of the flask. It was sometimes necessary to add water two or three times in order to obtain maximum yields. Recrystallization three times from a mixture of 75 cc. of methyl alcohol and 200 cc. of water yielded fine white needles, M.P. 78–80°. Thus, when butynediol and nitroform are heated in methyl alcohol at the reflux temperature, a reaction occurs which yields a white needle-like product, M.P. 79–80°.

The results of a C, H and N analysis of this compound show that the molecular ratio of nitroform to butynediol was 1:1 and the molecular weight indicated strongly that the product was a result of the addition of one molecule of nitroform to one molecule of butynediol. Considerable work was done to determine the structure of the product obtained. A discussion of the experiments carried out for this purpose follows:

(a) The nitro compound reacted with benzoyl chloride at 35° in the presence of pyridine to form the monobenzoate. The dibenzoate can not be prepared.

(b) The compound reacted with phenylisocyanate at 40° in the presence of pyridine to form the monourethane. The diurethane cannot be prepared.

(c) The compound does not add bromine in carbon tetrachloride, methyl alcohol, chloroform, ethylene dibromide or acetic acid even under the influence of ultraviolet light. The monobenzoate and monourethane fail to add bromine.

(d) No derivative is obtained when the nitro compound is treated with 2,4-dinitrobenzenesulfonyl chloride in either ethylene dibromide or acetic acid.

(e) Infrared analysis of the compound indicated the presence of the nitro group and a hydroxyl group in the product but failed to show the presence of a double bond. Analysis of the benzoate derivative revealed the absence of a free hydroxyl group. In both molecules an oxygen ether linkage was noted and comparison of the infrared absorption curves for tetrahydrofuran and the unknown nitro compound indicated the same cyclic ether structure to be present. The absorption curves of the nitro compound and its benzoate definitely compared to tetrahydrofuran.

On the basis of these facts, it was possible to assign a structure for the addition product of nitroform and butynediol. The nitroform apparently added to the triple bond to form an olefin which underwent a shift of the double bond followed by the formation of a 5-membered cyclic ether with one free hydroxyl group. In this way the double bond and one hydroxyl group were destroyed which explains why only a monobenzoate or urethane was formed.

(f) A reaction with phosphorus tribromide produced two compounds: the first, in greater amount, was a white solid, M.P., 184–5°, with an empirical formula $C_5H_8N_2O_6$, and the second, another white solid, M.P., 118–120°, with an empirical formula, $C_5H_6N_3O_7Br$. The first compound was a molecule from which one nitro group has been removed with no bromination. The second was the normal compound formed by a bromine displacing an hydroxyl group.

(g) Reduction with hydrogen in a Parr bomb with Adams' platinum oxide catalyst consumed the theoretical amount of hydrogen to reduce 3 nitro groups. Since the 3 nitro groups are on one carbon, the reduced product was a triamine which gave an amidine upon further treatment.

Although there is a possibility of rearrangement and hence isomers, the above-described reaction product of butynediol-1,4 and nitroform is definitely believed to be 2-hydroxy-4-trinitromethyl-tetrahydrofuran as represented by the following structural formula:

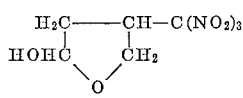

Further details of the preparation of the benzoate above-mentioned are as follows. Into a 50 cc. two-necked flask, equipped with magnetic stirrer, thermometer and gas inlet and outlet tubes, 4.0 g. of the addition product of butynediol and nitroform, was placed along with 3.0 g. of benzoyl chloride and 5.0 drops of pyridine. This mixture was stirred and after 5 minutes, more pyridine was added dropwise until the temperature reached 35°. A slow stream of nitrogen was passed into the flask during the reaction. At the end of three hours, during which time the temperature remained between 30–35°, the reaction mixture was taken up in 25 cc. of warm ethyl alcohol and placed in a cooler at $-10°$ for 24 hours. Impure crystals of the benzoate were twice recrystallized from ethyl alcohol to produce a white needle-like product, M.P., 92–93°. An attempt was made to prepare the dibenzoate of the addition product of butynediol and nitroform following the procedure described above. When more pyridine was used at 75°, only the monobenzoate was obtained. When the monobenzoate was used as starting material, it was recovered unreacted.

Further details of the preparation of the urethane above-mentioned are as follows. The procedure used in the preparation of the monourethane was the same as used in the above reactions. 4 g. of the addition product of butynediol and nitroform and 3.0 g. of phenylisocyanate were stirred together with just enough pyridine to effect solution. After 5 minutes pyridine was added dropwise until the temperature reached 40°. It was sometimes necessary to cool the reaction at this point to maintain the temperature below 40°. Stirring was continued for 2–3 hours until the product mixture became viscous. It was taken up in 20 cc. of ethanol and cooled. Crystals were obtained by vacuum filtration which were a mixture of the desired product and diphenylurea. Recrystallization twice from a 3:1 mixture of benzene and ethanol yielded a pure compound, M.P. 148–151°. All attempts to prepare the diurethane following the procedure described above failed.

Further details of the phosphorus tribromide derivative above-mentioned are as follows. A solution of 10 g. of the butynediol-nitroform addition product in 20 ml. of chloroform was stirred while 19.5 g. of phosphorus tribromide in 10 ml. of chloroform were added dropwise. An amorphous solid slowly precipitated out of solution and at the end of one hour it was filtered. Rubbing the solid in alcohol yielded 4.0 g. of a white material, M.P., 173–6°, which was recrystallized twice from chloroform to yield a heavy white prism, M.P. 184–185°.

The chloroform filtrate was hydrolyzed with water precipitating 1.1 g. of a white solid which was recrystallized from chloroform, M.P., 118–120°, and from the analysis was the monobromide, $C_5H_6N_3O_7Br$. Evaporation of the remaining chloroform solution left a brown liquid from which a few crystals appeared on cooling but melted with decomposition.

From the foregoing, it is apparent that a novel compound has been made which is useful for a variety of purposes. It may be employed as an intermediate in the preparation of numerous derivatives. For example, the nitro groups can be converted to amine groups or aminated as above described or by other suitable convention processes and the hydroxyl group can be esterified to give, for example, benzoates and maleates and substituted by suitable conventional processes (for example, halogenation as by bromine). It is also apparent that a particularly useful new class of chemical compounds has been produced which can be represented by the following structural formula:

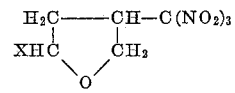

wherein X is characterized in that it does not break the ether ring and can be OH; the benzoate radical,

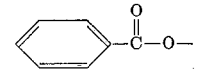

the maleate radical,

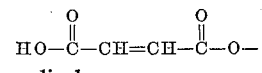

the phenylurethane radical,

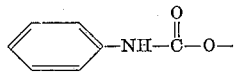

or a halogen. The benzoate compound and the maleate compound are useful as detergents, and the phenyl isocyanate reaction product is polymerizable into plastics.

The above-described 2-hydroxy-4-trinitromethyl-tetrahydrofuran is useful as a mild oxidizing agent and can be used in place of perbenzoic acid in the preparation of pyridine oxides.

3-butyne-1-ol

Nitroform also reacted with 3-butyne-1-ol in ethyl alcohol at 80° in the presence of the mercury catalyst (described hereinafter). White platelets were obtained, which upon purification melted at 40–41°. The product was the result of the addition of one molecule of nitroform to one molecule of 3-butyne-1-ol as shown by the molecular weight and the results of C, H and N analysis. This addition compound did not form a benzoate with benzoyl chloride in the presence of pyridine at room temperature, but at 70–80° a reaction occurred producing a fine white needle-like product, M.P., 68–70°, which was not identified. The addition product of nitroform and 3-butyne-1-ol failed to brominate in the presence of conventional solvents with or without ultraviolet light.

The infrared absorption spectrum for this compound repeated the same peaks as found in the butynediol product except for the free hydroxyl and included the peaks found in tetrahydrofuran. The reaction, thus, is similar to the reaction for butynediol. Because of the position of the triple bond in relation to the hydroxyl group in 3-butyne-1-ol, it is not possible for a rearrangement before cyclization. The following structural formula is believed the correct one, although there might be placement of the trinitromethyl group at the 2-position.

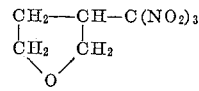

Reduction consumed the quantitative amount of hydrogen to reduce the nitro groups to a primary amine. From the reduction mixture, a basic liquid, B.P., 130°, was isolated which had an analysis indicating the empirical formula, $C_5H_{11}ON$. It was not possible to make a derivative of this amine with benzoyl chloride, phenyl isothiocyanate and p-toluenesulfonyl chloride. However, treatment of the alcoholic reduction mixture directly with $NaNO_2$ and HCl released one mole of nitrogen gas per mole of the unidentified compound and produced a liquid, B.P., 72–3°/5mm., the analysis of which agreed very well with $C_5H_9O_3N$. Infrared analysis indicated the presence of tetrahydrofuran nucleus and also a nitrite group so that the following compound had resulted:

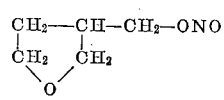

When an attempt to produce cleavage of the ether ring was made, a bromohydrin was obtained when the nitro compound was treated with 48% HBr but no further bromination was accomplished with excess HBr or with PBr₃.

2-heptyne-1-ol

Nitroform also reacted with 2-heptyne-1-ol in ethyl alcohol at 80° in the presence of the mercury catalyst. The product, white platelets melting at 49–50°, was a result of the addition of one molecule of nitroform to one molecule of 2-heptyne-1-ol as determined by its composition and molecular weight ($C_8H_{13}O_7N_3$). It did not react with benzoyl chloride to form a benzoate and does not brominate. The infrared analysis showed the same nitro groups, ether linkage and tetrahydrofuran ring so that the reaction is the same as with the preceding alcohols. A rearrangement had to occur before the cyclic ether was formed, as in the case with butynediol-1,4. The following structural formula is believed to be the correct one, although (like with butynediol-1,4) the possibility of an isomer exists:

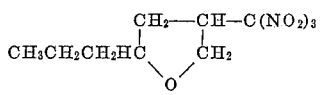

The above-described procedure in connection with butynediol-1,4 was followed in reacting nitroform with both 3-butyne-1-ol and 2-heptyne-1-ol.

Into a three-necked flask equipped with stirrer, condenser and thermometer, 10.0 g. of nitroform, 7.0 g. of the acetylenic alcohol, and 25 ml. of ethyl alcohol were placed. The solution was stirred and 10.0 drops of catalyst in 5.0 ml. of ethyl alcohol was added. It was necessary to dilute the catalyst with ethyl alcohol first, as a violent reaction followed, if it were added directly to the reaction mixture. The solution was warmed to 60–65° and the heating source was removed. Considerable heat was liberated and the temperature slowly rose to 80° where it remained for approximately five minutes. As the temperature dropped, heating was resumed and the reaction was maintained at the reflux temperature for one to two hours. The resulting clear reddish solution was cooled to −10° to cause crystallization. Water was added after the crystals appeared, to obtain maximum yields. Recrystallization of the 3-butyne-1-ol product once from 1:1 methyl alcohol and water and twice from hexane gave white platelets, M.P., 41–42°.

*Analysis.*—Calc. for $C_5H_7O_7N_3$: C, 27.15; H, 3.17; N, 19.00. Found: C, 27.00; H, 3.15; N, 18.35.

The addition product of nitroform and 2-heptyne-1-ol was purified the same way to give white platelets, M.P., 49–50°.

*Analysis.*—Calc. for $C_8H_{13}O_7N_3$: C, 36.50; H, 4.95; N, 15.95. Found: C, 35.93; H, 4.77; N, 15.33.

From the immediately foregoing description concerning 3-butyne-1-ol and 2-heptyne-1-ol, it is apparent that two more novel compounds were made. These compounds are useful for a variety of purposes. They may be employed as intermediates in the preparation of numerous derivatives. For example, the nitro groups can be converted to amino groups by suitable conventional processes, such as above described. These two reaction products of nitroform are, like the above-described 2-hydroxy-4-trinitromethyl-tetrahydrofuran, useful as mild oxidizing agents and can be used in place of perbenzoic acid in the preparation of pyridine oxides. These compounds can be represented by the following formula:

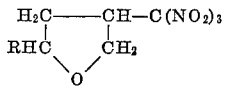

wherein R is OH, H or $C_3H_7$. From the foregoing, it is also apparent that a new class of compounds has been made which are useful as dye intermediates or special solvents and can be represented by the following formula:

$$H_2C\text{———}CH\text{—}CZ$$
$$RHC\diagdown\quad\diagup CH_2$$
$$O$$

wherein R is H, OH or $C_3H_7$; and CZ is

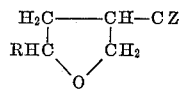

or

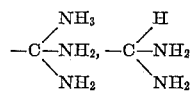

The nitroform reaction was attempted with tetramethylbutynediol-1,4 but it appeared that the four methyl groups sterically hindered the addition of the nitroform molecule to the triple bond. This clearly indicated that the herein disclosed method of nitrating alcohols is adapted for use with acetylenic compounds having an "unhindered acetylenic bond," as above defined. Tetramethylbutynediol has the structural potentialities for the formation of the tetrahydrofuran ring but treatment with nitroform did not produce any nitro product. The steric effect of the 4 methyl groups blocks the entrance of the nitroform molecule.

The presence of a free or terminal hydroxyl group in the acetylenic molecule is an essentially important factor in the formation of the present solid reaction products. The position of the hydroxyl group must be such that a cyclic structure can be formed by addition to the double bond. Propargyl alcohol, a three-carbon acetylenic alcohol, behaves similarly to the hydrocarbons, as described in the copending application hereinafter identified, in spite of the presence of the hydroxyl group. This is explained by the lack of at least 4 carbon atoms to form a 5-membered ring. There are only enough atoms in the molecule to form a 4-membered ether ring which would have internal strain. In 3-butyne-2-ol, the same structural relationship exists as in propargyl alcohol. Thus, a 5-membered cyclic ether cannot be formed and experimentally this was found to be the case.

The nitroform used in the above examples was prepared from tetranitromethane. Into a 500 cc. three-necked flask, equipped with stirrer and thermometer 200 ml. of distilled water, 35.3 g. of potassium hydroxide (85%) and 40.0 of glycerine were placed. This solution was cooled to 25° and 30.0 g. of tetranitromethane were added. Relatively vigorous stirring was employed and the temperature was maintained between 20° and 35° for approximately three hours. At this point the odor of tetranitromethane was absent from the reaction mixture and yellow crystals of potassium nitroform were suspended in the solution. The mixture was cooled and vacuum filtered. The filter cake was washed with 3–40 ml. portions of ice water, 2–50 ml. portions of cold alcohol, and with 50 ml. of cold ether. The yellow crystals were then placed in 400 ml. of hexane and dry hydrogen chloride was added with stirring until the yellow color had disappeared and only white crystals of KCl were suspended in the hexane. The salt was removed by suction filtration and the filter cake washed with 50 ml. of warm hexane. The hexane solution of nitroform was then subjected to vacuum until the excess HCl was removed. It was then either quick-cooled in a Dry Ice-acetone bath or placed in the freezer. White crystals of nitroform collected on the bottom and sides of the container. These were separated from the solvent by suction filtration and placed in the cooler. The hexane was saved for reuse as solvent for other batches of potassium nitroform.

The preparation of the catalyst (mercuric nitrate) was accomplished as follows. Seven grams of mercury were dissolved with heating in 20 ml. of 90% nitric acid. To the clear solution was added 30 ml. of water and the final solution was made up to 100 ml. with nitric acid. The solution was slightly yellow but became colorless on standing.

From the above, it is apparent that a novel method of nitrating acetylenic alcohols having an unhindered acetylenic bond, a terminal hydroxyl group and at least 4 carbon atoms has been invented.

A study of the foregoing examples of the reaction between nitroform and described acetylenic alcohols shows that cyclic solid addition products were formed only when (1) the hydroxyl group of the alcohols was "terminal," (2) the unhindered acetylenic bond, and (3) the alcohol contained at least 4 carbon atoms. The resulting 5-membered cyclic structure can be referred to as being characterized by having a tetrahydrofuran nucleus.

The application filed concurrently herewith in the name of Arthur H. Neeley (entitled Acetylenic-Nitro Compounds and assigned to the same assignee as the present invention) describes and claims methods and noncyclic products and compositions concerning, and derived from, the reaction of nitroform and certain acetylenic hydrocarbons, alcohols and other substituted hydrocarbons which do not produce the herein-described cyclic compounds.

All temperatures above mentioned are in degrees centigrade.

In summary, it is to be noted that, in the presence of a mercuric nitrate catalyst, nitroform will add to certain acetylenic alcohols having an unhindered acetylenic bond in methanol to produce solid products. These solid products are trinitromethyl derivatives of tetrahydrofuran. The free hydroxyl group is essential for the formation of a solid product since the corresponding methyl ethers fail to yield such a product. Acetylenic alcohols which are not capable of forming the 5-membered ether ring do not produce a cyclic structure nor solid nitroform addition product. An alcoholic solvent proved the best medium for this reaction.

What is claimed is:

1. A method of nitrating sterically unhindered-bonded acetylenic alcohols having four to seven carbon atoms in the longest carbon chain, a terminal hydroxyl group and a single acetylenic bond as the only unsaturation comprising reacting said alcohol with nitroform in the presence of mercuric nitrate and an alcohol solvent at the reflux temperature of said solvent.

2. A method of nitrating butynediol-1,4 comprising reacting said diol with nitroform in methyl alcohol at the reflux temperature of the alcohol and in the presence of mercuric nitrate.

3. A method of nitrating 4-carbon acetylenic alcohols having a sterically unhindered acetylenic linkage and a terminal hydroxyl group comprising reacting said alcohols and nitroform in the presence of mercuric nitrate and at a temperature of about 80° C.

4. A method of nitrating 4-carbon acetylenic alcohols having a terminal hydroxyl group and a sterically unhindered acetylenic bond comprising reacting said alcohols and nitroform in the presence of mercuric nitrate and in an aliphatic alcohol, and conducting the reaction at the reflux temperature of the aliphatic alcohol.

5. As a new class of chemical compounds, the compounds having the composition represented by the formula:

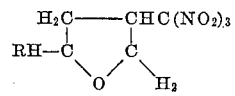

wherein R is selected from the group consisting of H—; HO—;

$CH_3CH_2CH_2$—; 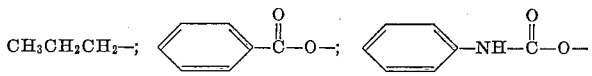

and

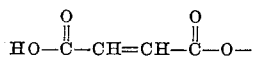

6. As a new chemical compound, the compound having the composition represented by the formula:

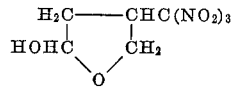

7. As a new chemical compound, the compound having the composition represented by the formula:

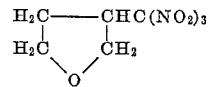

8. As a new chemical compound, the compound having the composition represented by the formula:

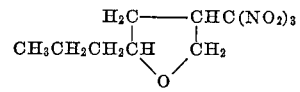

References Cited by the Examiner

UNITED STATES PATENTS 2,105,808    1/38    Cramer _____ 260—347.7

NICHOLAS S. RIZZO, *Primary Examiner.*

LEON D. ROSDOL, ROGER L. CAMPBELL, CARL D. QUARFORTH, *Examiners.*